(12) United States Patent
Yoon et al.

(10) Patent No.: US 12,006,612 B2
(45) Date of Patent: *Jun. 11, 2024

(54) AUTOMATED LENS CLEANING FOR A CAMERA ASSEMBLY BASED ON IMAGE RECOGNITION IN A WASHING MACHINE APPLIANCE

(71) Applicant: Haier US Appliance Solutions, Inc., Wilmington, DE (US)

(72) Inventors: Je Kwon Yoon, Seongnam (KR); Hoyoung Lee, Seoul (KR); Khalid Jamal Mashal, Louisville, KY (US); JaeHyo Lee, Seoul (KR); Minsu Kim, Daegu (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 486 days.

This patent is subject to a terminal disclaimer.

(21) Appl. No.: 17/330,802

(22) Filed: May 26, 2021

(65) Prior Publication Data
US 2022/0380959 A1 Dec. 1, 2022

(51) Int. Cl.
*D06F 33/47* (2020.01)
*D06F 23/02* (2006.01)
(Continued)

(52) U.S. Cl.
CPC ............ *D06F 33/47* (2020.02); *D06F 23/025* (2013.01); *D06F 23/04* (2013.01); *D06F 34/14* (2020.02); *D06F 39/02* (2013.01); *D06F 39/06* (2013.01); *D06F 39/088* (2013.01); *D06F 39/14* (2013.01); *G02B 27/0006* (2013.01); *G06T 7/0002* (2013.01); *H04N 7/18* (2013.01);
(Continued)

(58) Field of Classification Search
CPC ........ D06F 23/025; D06F 23/04; D06F 33/47; D06F 34/14; D06F 39/02; D06F 39/06; D06F 39/088; D06F 39/14
See application file for complete search history.

(56) References Cited

U.S. PATENT DOCUMENTS

| 10,775,319 B2 | 9/2020 | Yasuhiko | |
| 11,639,573 B2 * | 5/2023 | Ashrafzadeh | ........... D06F 58/30 68/12.02 |

(Continued)

FOREIGN PATENT DOCUMENTS

| JP | 2020192000 A | 12/2020 | |
| KR | 20190047243 A | 5/2019 | |
| WO | WO-2022080934 A1 * | 4/2022 | ............. D06F 34/18 |

*Primary Examiner* — Joseph L. Perrin
(74) *Attorney, Agent, or Firm* — Dority & Manning, P.A.

(57) ABSTRACT

A washing machine appliance includes a camera assembly mounted in view of a wash chamber for obtaining images of the wash chamber. The lens of the camera assembly is positioned adjacent a water outlet of a water dispenser and a controller is configured to facilitate an automated cleaning method for the camera assembly, the method including obtaining one or more images of the wash chamber using the camera assembly, analyzing the one or more images to determine an image quality, determining that the image quality has dropped below a quality threshold, and operating the water dispenser to perform a lens cleaning operation in response to determining that the image quality has dropped below the quality threshold.

18 Claims, 7 Drawing Sheets

(51) Int. Cl.
    *D06F 23/04*        (2006.01)
    *D06F 34/14*        (2020.01)
    *D06F 39/02*        (2006.01)
    *D06F 39/06*        (2006.01)
    *D06F 39/08*        (2006.01)
    *D06F 39/14*        (2006.01)
    *G02B 27/00*       (2006.01)
    *G06T 7/00*         (2017.01)
    *H04N 7/18*         (2006.01)
    *D06F 105/02*      (2020.01)

(52) U.S. Cl.
    CPC ............... *D06F 2105/02* (2020.02); *G06T 2207/20081* (2013.01); *G06T 2207/20084* (2013.01); *G06T 2207/30168* (2013.01); *G06T 2207/30204* (2013.01)

(56) References Cited

U.S. PATENT DOCUMENTS

| | | | | |
|---|---|---|---|---|
| 2005/0196046 A1* | 9/2005 | Hudnut | ............... | A47L 15/4293 |
| | | | | 382/218 |
| 2019/0048504 A1 | 2/2019 | Leitert | | |
| 2019/0369031 A1* | 12/2019 | Niikura | ............. | G05B 23/0283 |
| 2019/0382941 A1* | 12/2019 | Hwang | ................... | D06F 33/36 |
| 2022/0243377 A1* | 8/2022 | Mashal | ................. | D06F 37/266 |
| 2022/0275557 A1* | 9/2022 | Morita | .................... | G01F 9/008 |

\* cited by examiner

AUTOMATED LENS CLEANING FOR A CAMERA ASSEMBLY BASED ON IMAGE RECOGNITION IN A WASHING MACHINE APPLIANCE

FIELD OF THE INVENTION

The present subject matter relates generally washing machine appliances, or more specifically, to systems and methods of cleaning camera assemblies within a washing machine appliance for improved imaging.

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle of a washing machine appliance, a drain pump assembly may operate to discharge water from within sump.

It may be desirable for a washing machine or other laundry appliances to include a camera assembly for obtaining images from within the wash chamber. For example, images obtained by the camera assembly may be used to obtain useful information related to wash performance, such as load type, water level, out-of-balance conditions, or other visible conditions of a load. Notably, however, when cameras are positioned within a wash chamber, the camera lens might be exposed to water, detergent, steam, etc. and may have a tendency to collect dirt, soap scum, grime, or other contaminants after prolonged use. These undesirable contaminants can affect the quality of the images obtained by camera assembly and the usefulness of information obtained from those images.

Accordingly, a washing machine appliance including a camera assembly with features for improved performance would be desirable. More specifically, a method for improving the operation of a camera assembly through an automated cleaning process would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided including a wash tub positioned within a cabinet, a wash basket rotatably mounted within the wash tub and defining a wash chamber configured for receiving a load of clothes, a water dispenser mounted within the cabinet for selectively providing a flow of water into the wash tub through a water outlet, a camera assembly mounted within the cabinet in view of the wash chamber, the camera assembly being positioned such that a lens of the camera assembly is positioned adjacent the water outlet, and a controller operably coupled to the camera assembly and the water dispenser. The controller is configured to obtain one or more images of the wash chamber using the camera assembly, analyze the one or more images to determine an image quality, determine that the image quality has dropped below a quality threshold, and operate the water dispenser to perform a lens cleaning operation in response to determining that the image quality has dropped below the quality threshold.

In another exemplary embodiment, a method of operating a washing machine appliance is provided. The washing machine appliance includes a wash basket rotatably mounted within a wash tub and defining a wash chamber configured for receiving a load of clothes, a water dispenser for selectively providing a flow of water into the wash tub through a water outlet, and a camera assembly mounted adjacent the water dispenser and in view of the wash chamber. The method includes obtaining one or more images of the wash chamber using the camera assembly, analyzing the one or more images to determine an image quality, determining that the image quality has dropped below a quality threshold, and operating the water dispenser to perform a lens cleaning operation in response to determining that the image quality has dropped below the quality threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
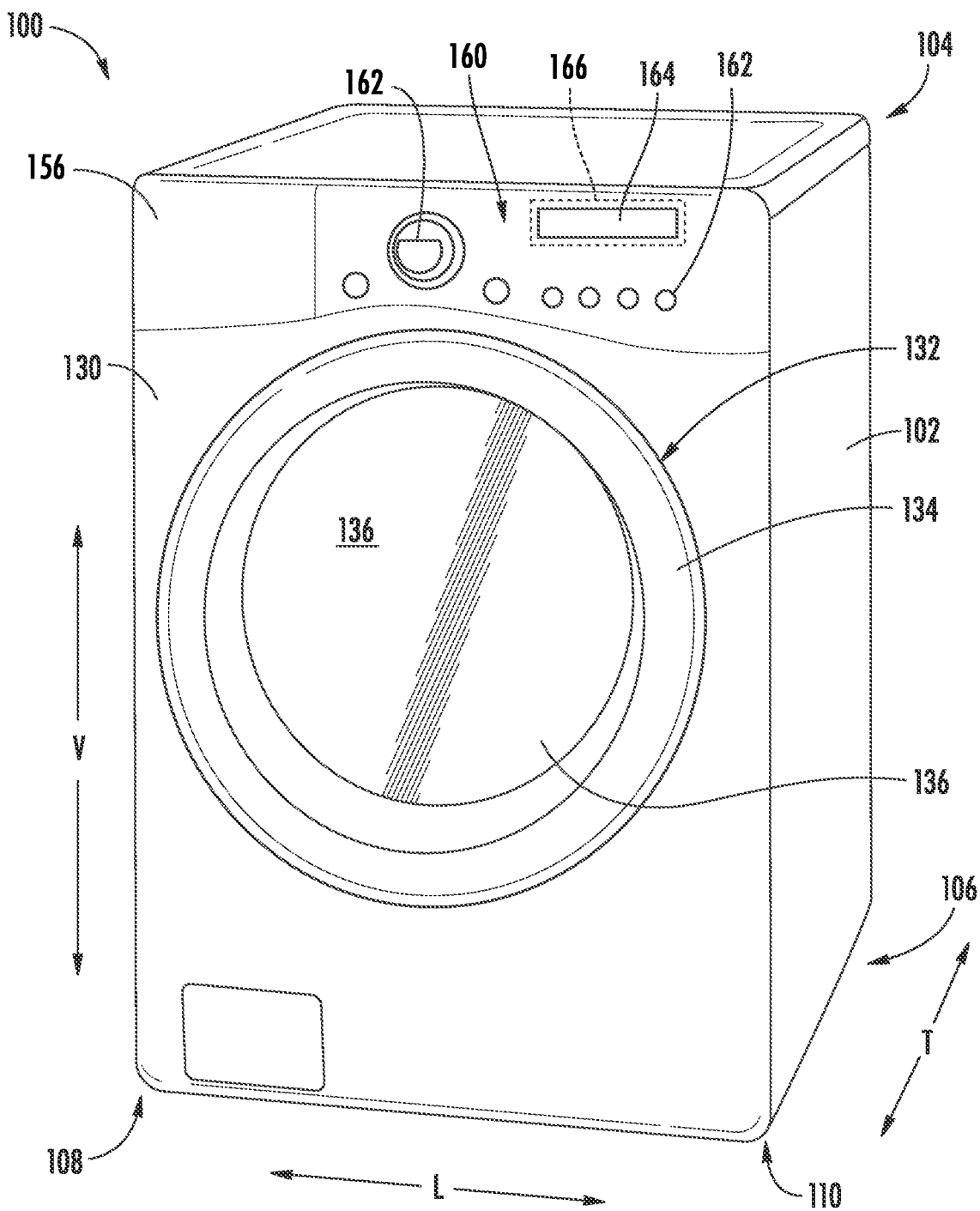
FIG. 1 provides a perspective view of an exemplary washing machine appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
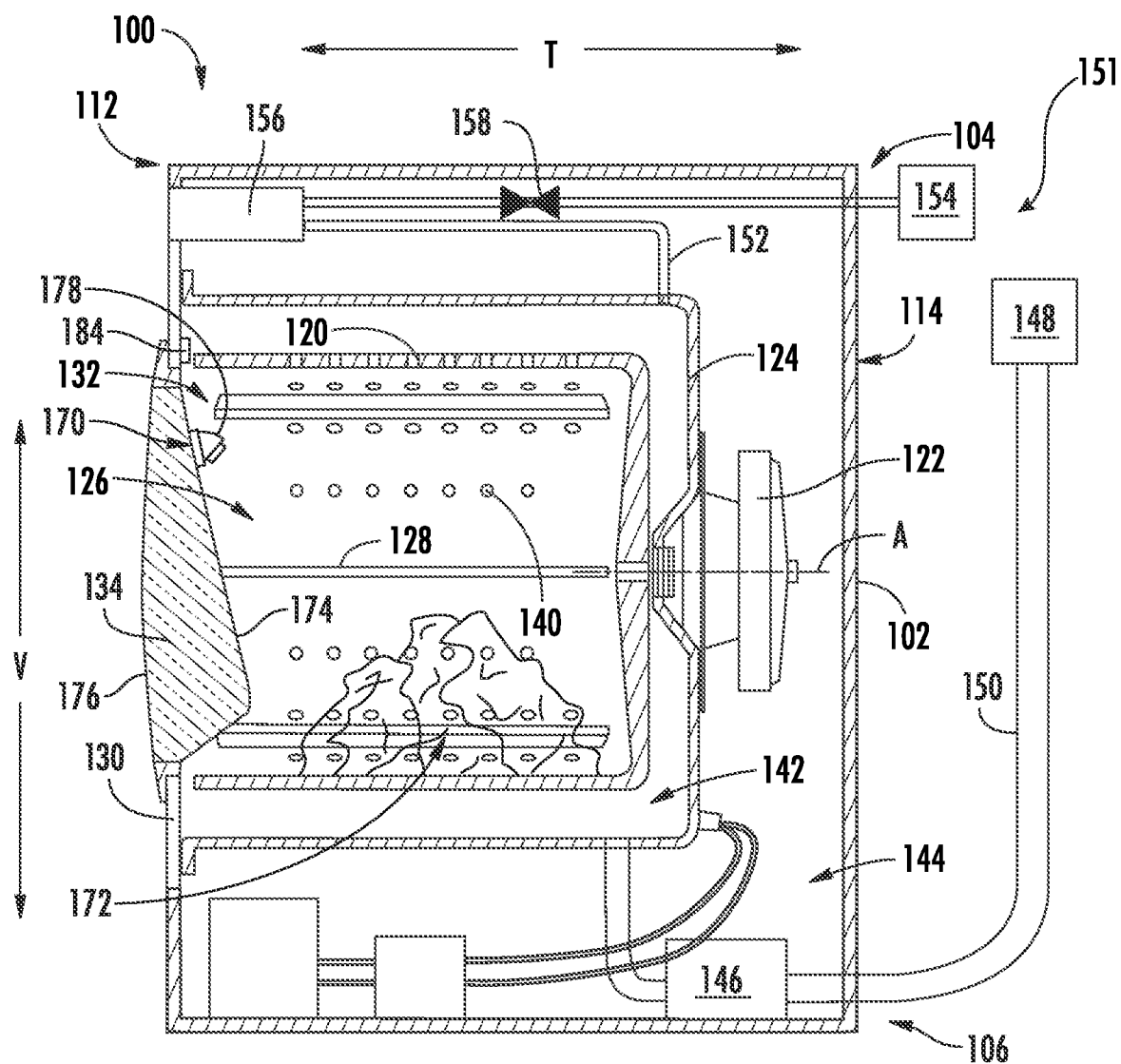
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. According to exemplary embodiments, washing machine appliance 100 includes a cabinet 102 that is generally configured for containing and/or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, washing machine appliance 100 generally defines a vertical direction V, a lateral direction L, and a transverse direction T, each of which is mutually perpendicular, such that an orthogonal coordinate system is generally defined. Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Figure 4:
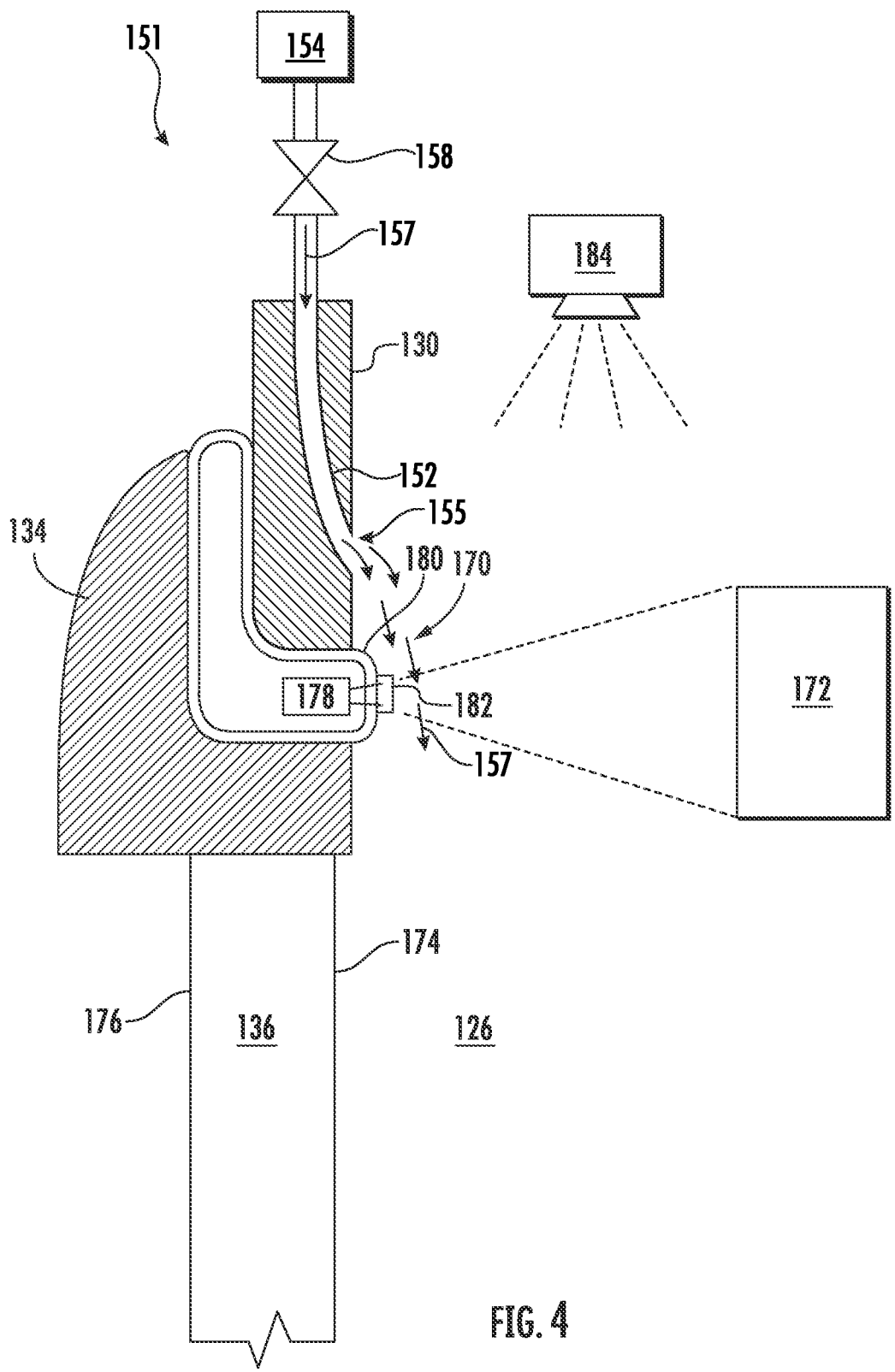
FIG. 4 provides a schematic view of a door and gasket sealed against a cabinet of the exemplary washing machine of FIG. 1, along with a camera mounted within the gasket according to an exemplary embodiment of the present subject matter.

As best shown in FIGS. 2 and 4, washing machine appliance 100 may further include a water dispenser 151 that is generally configured for dispensing a flow of water and/or wash fluid into wash tub 124 to facilitate appliance operation. For example, water dispenser 151 generally includes a spout 152 that is configured for directing a flow of fluid into wash tub 124. For example, spout 152 may be in fluid communication with a water supply 154 in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

Figure 5:
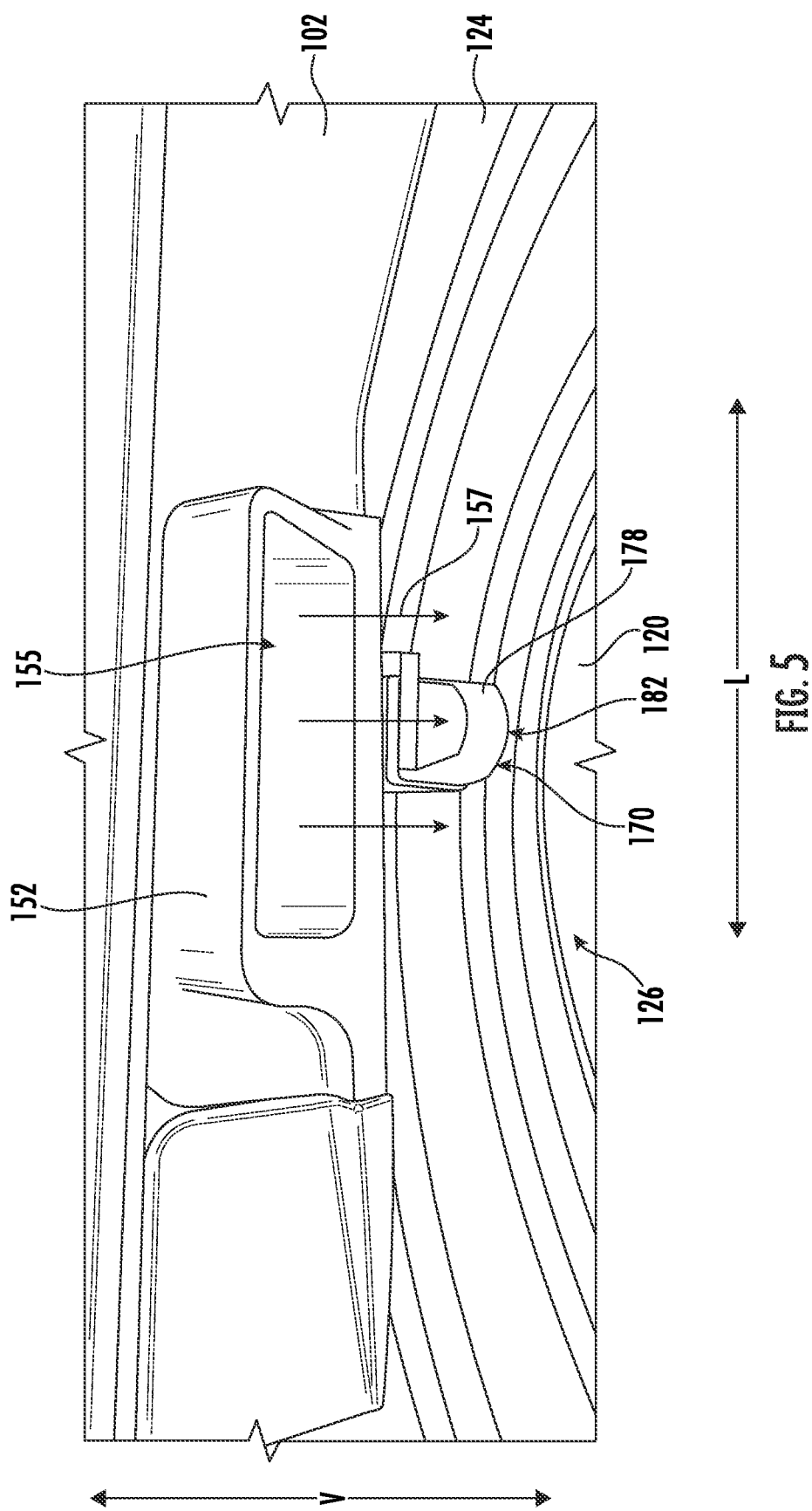
FIG. 5 provides a front view of a camera assembly installed below a water outlet in a top load washing machine appliance according to exemplary embodiments of the present subject matter.

As best illustrated in FIGS. 4 and 5, spout 152 may generally define a water outlet 155 through which the flow of water (e.g., as identified generally by reference numeral 157) may be discharged into wash tub 124. More specifically, FIGS. 2 and 4 illustrate the exemplary positioning of spouts 152 in a front load washing machine appliance, e.g., such as extending through wash tub 124, extending through front panel 130, passing through a door gasket (e.g., such as gasket 180 described below), etc. By contrast, FIG. 5 illustrates the exemplary positioning of spout 152 in a top load appliance, e.g., proximate a rear of wash tub 124 and above wash tub 124 and wash basket 120. It should be appreciated that the location and configuration of the spout 152 and water outlet 155 may vary while remaining within the scope of the present subject matter.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water 157 from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water 157, e.g., for a rinse cycle, lens cleaning, etc. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users. Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Figure 3:
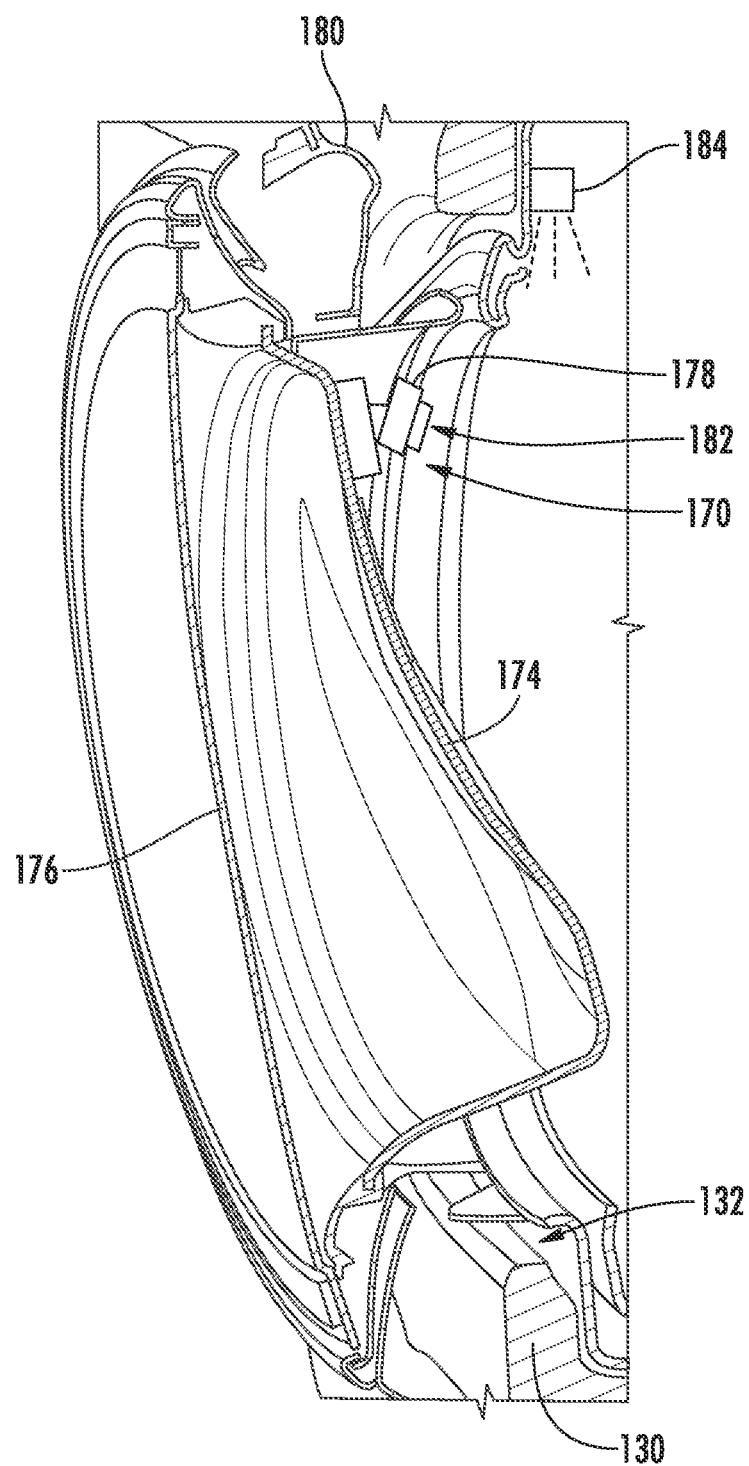
FIG. 3 provides a cross-sectional view of the exemplary washing machine appliance of FIG. 1 with a camera assembly mounted on a door according to an exemplary embodiment of the present subject matter.

Referring now specifically to FIGS. 2 and 3, washing machine appliance 100 may further include a camera assembly 170 that is generally positioned and configured for obtaining images of wash chamber 126 or a load of clothes (e.g., as identified schematically by reference numeral 172) within wash chamber 126 of washing machine appliance 100. Specifically, according to the illustrated embodiment, door 134 of washing machine appliance 100 comprises and inner window 174 that partially defines wash chamber 126 and an outer window 176 that is exposed to the ambient environment. According to the illustrated exemplary embodiment, camera assembly 170 includes a camera 178 that is mounted to inner window 174. Specifically, camera 178 is mounted such that is faces toward a bottom side of wash tub 124. In this manner, camera 178 can take images or video of an inside of wash chamber 126 and remains unobstructed by windows that may obscure or distort such images.

Referring now briefly to FIG. 4, another installation of camera assembly 170 will be described according to an exemplary embodiment of the present subject matter. Due to the similarity between this and other embodiments, like reference numerals may be used to refer to the same or similar features. According to this exemplary embodiment, camera assembly 170 is mounted within a gasket 180 that is positioned between a front panel 130 of cabinet 102 and door 134. Although exemplary camera assemblies 170 are illustrated and described herein, it should be appreciated that according to alternative embodiments, washing machine appliance 100 may include any other camera or system of imaging devices for obtaining images of the load of clothes 172.

It should be appreciated that camera assembly 170 may include any suitable number, type, size, and configuration of camera(s) 178 for obtaining images of wash chamber 126. In general, cameras 178 may include a lens 182 that is constructed from a clear hydrophobic material or which may otherwise be positioned behind a hydrophobic clear lens. So positioned, camera assembly 170 may obtain one or more images or videos of clothes 172 within wash chamber 126, as described in more detail below. Referring still to FIGS. 2 through 4, washing machine appliance 100 may further include a tub light 184 that is positioned within cabinet 102 or wash chamber 126 for selectively illuminating wash chamber 126 and/or the load of clothes 172 positioned therein. It should be appreciated that according to exemplary embodiments, tub light 184 may be integrated into camera assembly 170.

As explained in more detail below, aspects of the present subject matter are generally directed to systems and methods for cleaning the camera assembly 170 for improved imaging and appliance performance. For example, according to exemplary embodiments, image analysis is performed to determine when lens 182 of camera assembly 170 is dirty, soapy, or otherwise needs cleaning for improved imaging. If lens 182 needs to be cleaned, water dispenser 151 may be used to dispense a flow of fluid (e.g., flow of water 157) over camera assembly 170 and/or lens 182 to clean the lens 182 and improve the images obtained by camera assembly 170.

As such, camera assembly 170 is typically positioned adjacent water dispenser 151, e.g., such that lens 182 is positioned in the path of the flow of water 157. Specifically, according to the illustrated embodiments (e.g., as best shown in FIGS. 4 and 5), lens 182 is typically positioned directly below water outlet 155 of spout 152. In this manner, water dispenser 151 may selectively and periodically clean lens 182, e.g., by opening water supply valve 158 for a predetermined amount of time when image quality deteriorates. For example, as shown in FIG. 4, washing machine appliance 100 is a front load washing machine appliance, water outlet 155 is positioned above the or adjacent to door 134 (e.g., within front panel 130 or within gasket 180), and camera assembly 170 is mounted to door 130 (see, e.g., FIG. 3) or within a gasket 180 (see, e.g., FIG. 4) such that the flow of water 157 from water dispenser 151 may pass directly over lens 182.

By contrast, as shown for example in FIG. 5, washing machine appliance 100 may be a top load washing machine appliance, water outlet 155 may be positioned above wash tub 124 and proximate a rear of wash tub 124, and lens 182 of camera assembly 170 may be positioned below water outlet 155 and over wash tub 124. More specifically, camera assembly 170 may be positioned such that lens 182 protrudes outward into wash tub 124 and toward an axis of rotation of wash basket 120 further than water outlet 155. In this manner, flow of water 157 may have a tendency to cascade over lens 182 to facilitate the lens cleaning process. Although exemplary water dispenser 151 and camera assembly 170 positioning are described herein, it should be appreciated that these exemplary embodiments are not intended to be limiting. Thus, the angle, shape, size, or position of lens 182 relative to water dispenser 151 may be vary while remaining within the scope of the present subject matter.

Notably, controller 166 of washing machine appliance 100 (or any other suitable dedicated controller) may be communicatively coupled to camera assembly 170, tub light 184, water supply valve 158, and other components of washing machine appliance 100. As explained in more detail below, controller 166 may be programmed or configured for obtaining images using camera assembly 170, e.g., in order to detect certain operating conditions and improve the performance of washing machine appliance. In addition, controller 166 may be programmed or configured to perform methods to monitor the quality of images obtained by camera assembly 170, determine when the image quality has dropped below a quality threshold (e.g., indicating fouling or obstruction of the lens), and implement corrective action, e.g., by cleaning the lens, improving the obtained images, and improving performance of washing machine appliance 100.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances (see, e.g., FIG. 5). In addition, aspects of the present subject matter may be utilized in a combination washer/dryer appliance. Indeed, it should be appreciated that aspects of the present subject matter may further apply to other laundry appliances, such as combination washers/dryers, dryer appliances, etc.

Now that the construction of washing machine appliance 100 and the configuration of controller 166 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. In exemplary embodiments, the various method steps as disclosed herein may be performed by controller 166 or a separate, dedicated controller.

Figure 6:
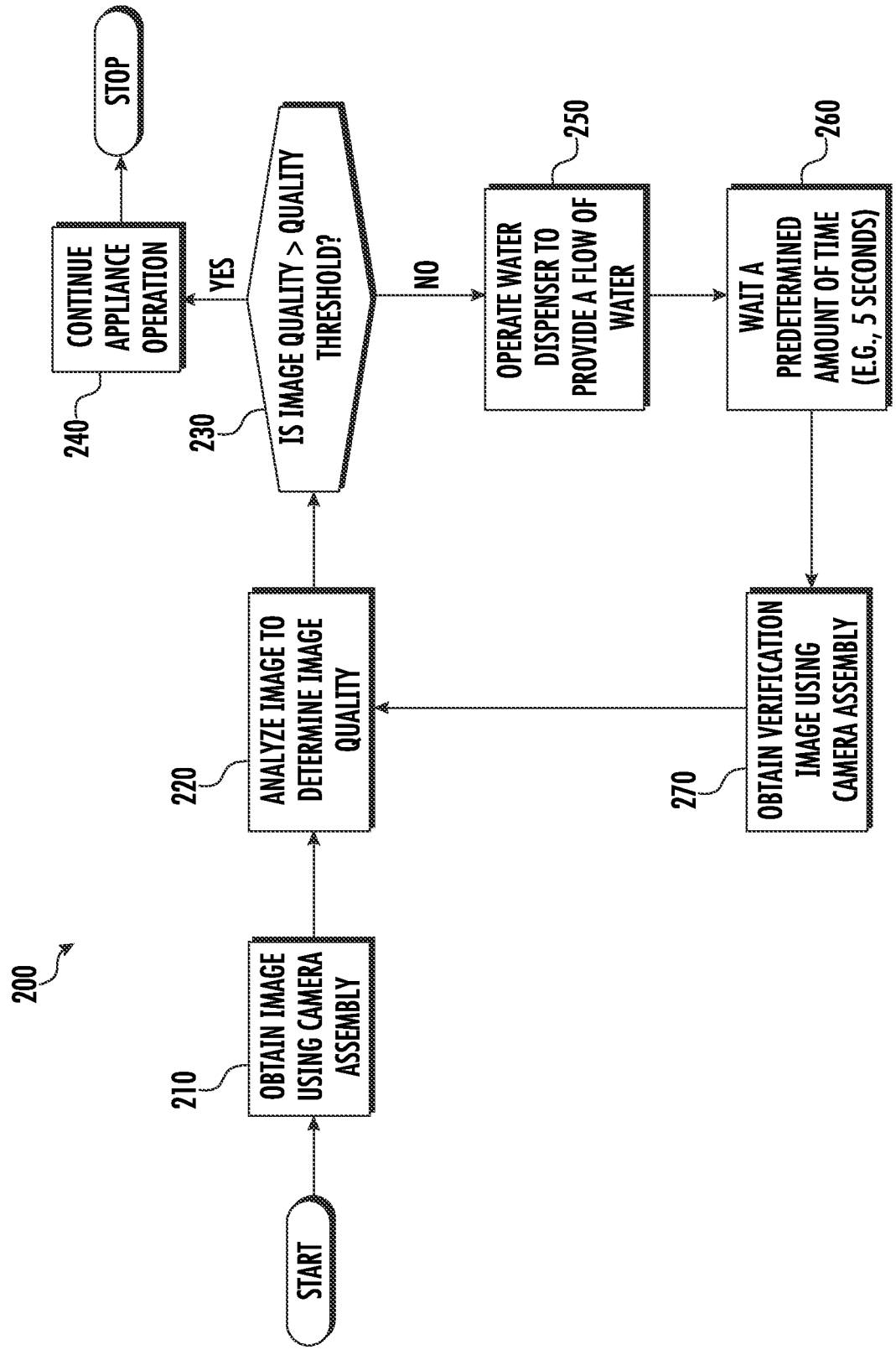
FIG. 6 provides a flow diagram illustrating an exemplary process for implementing an automated camera cleaning process according to an exemplary embodiment of the present subject matter.

Referring now to FIG. 6, method 200 includes, at step 210, obtaining one or more images of the wash basket or the wash chamber using a camera assembly. For example, continuing the example from above, camera assembly 170 may capture images of wash chamber 126 of washing machine appliance 100. As explained in more detail below, these images may be used to determine an image quality of the obtained images in order to assess whether a lens cleaning procedure needs to be performed for improved image quality. Specifically, by identifying poor image quality due to built up detergent, bubbles, water spots, etc., the lens may be cleaned such that subsequently obtained images have higher quality and provide more useful information regarding the wash operation.

Thus, step 210 includes obtaining a series of frames or a video within wash chamber 126. For example, step 210 may include taking a still image from a video clip or otherwise obtaining a still representation or photo from the video clip. It should be appreciated that the images obtained by camera assembly 170 may vary in number, frequency, angle, resolution, detail, etc. in order to improve the clarity of wash chamber 126. In addition, according to exemplary embodiments, controller 166 may be configured for illuminating the tub using tub light 184 just prior to obtaining images.

Referring still to FIG. 6, method 200 may include, at step 220, analyzing the one or more images using a machine learning image recognition process to determine an image quality of the obtained images. It should be appreciated that any suitable image processing or recognition method may be used to analyze the images obtained at step 210 and facilitate determination of image quality. In addition, it should be appreciated that this image analysis or processing may be performed locally (e.g., by controller 166) or remotely (e.g., by a remote server).

As used herein, the term "image quality" may be used generally to refer to any quantitative or qualitative measure of the quality of the images obtained by camera assembly 170, particularly with respect to their ability to effectively facilitate appliance operating cycles and improve cycle performance. Thus, image quality may refer generally to a measure of the amount of dirt or soil on lens 182, to identify the presence of bubbles or detergent on camera assembly 170, or to identify any other condition that is affecting the images obtained by camera assembly 170.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor image quality of obtained images. It should be appreciated that this image analysis or processing may be performed locally (e.g., by controller 166) or remotely (e.g., by offloading image data to a remote server or network).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify reference marks for features, to compared to reference images, or to otherwise estimate an image quality of obtained images. For example, one or more reference images may be obtained when a particular condition exists, and these references images may be stored for future comparison with images obtained during appliance operation. Similarities and/or differences between the reference image and the obtained image may be used to extract useful information for improving appliance performance.

According to exemplary embodiments, image processing may include blur detection algorithms that are generally intended to compute, measure, or otherwise determine the amount of blur in an image. For example, these blur detection algorithms may rely on focus measure operators, the Fast Fourier Transform along with examination of the frequency distributions, determining the variance of a Laplacian operator, or any other methods of blur detection known by those having ordinary skill in the art. In addition, or alternatively, the image processing algorithms may use other suitable techniques for recognizing or identifying items or objects, such as edge matching or detection, divide-and-conquer searching, greyscale matching, histograms of receptive field responses, or another suitable routine (e.g., executed at the controller 166 based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

Figure 7:
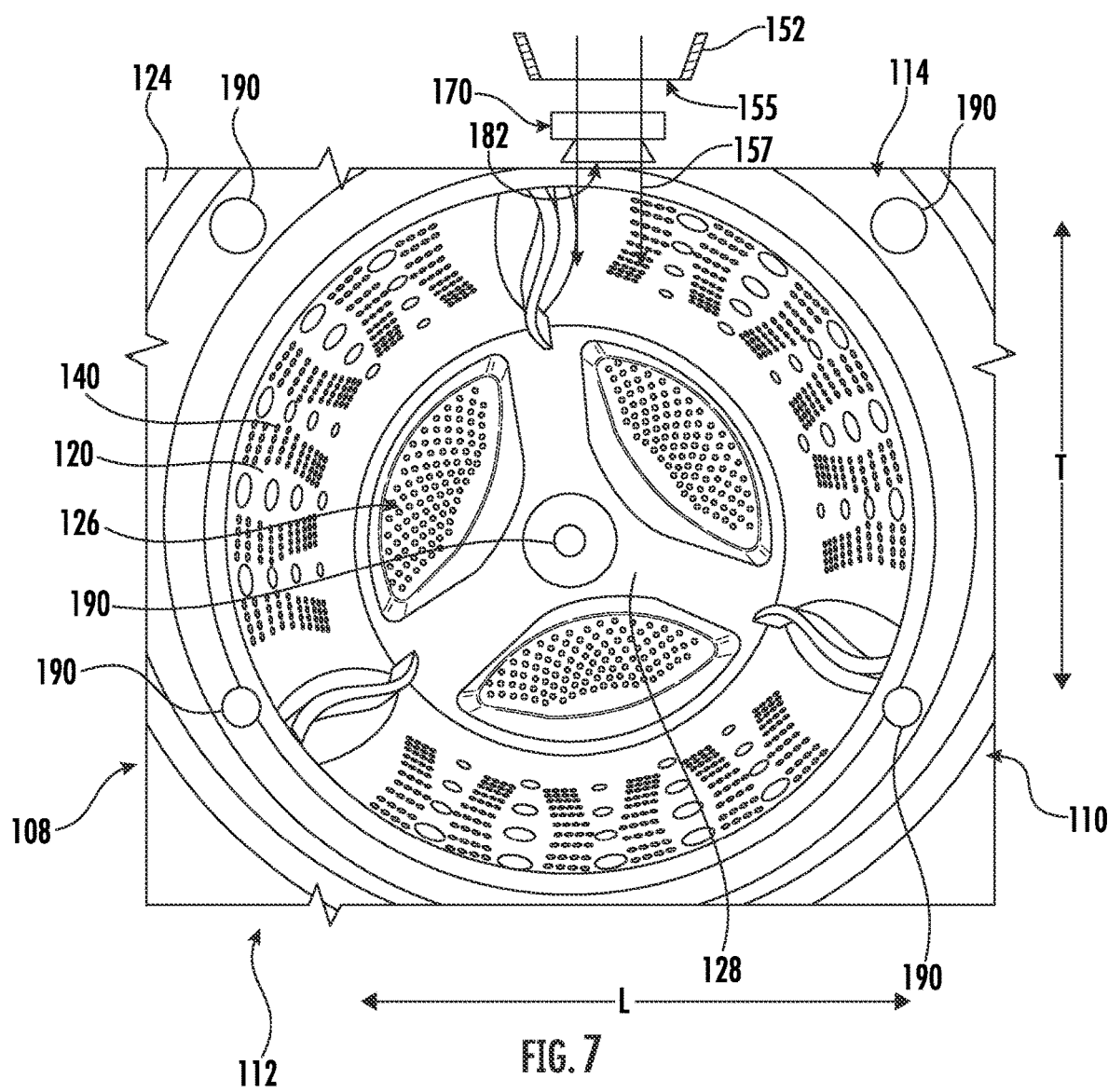
FIG. 7 provides a top view of reference marks on a wash basket and/or a wash tub of an exemplary washing machine appliance according to exemplary embodiments of the present subject matter.

For example, as shown for example in FIG. 7, one or more reference images may be obtained when a particular condition exists (e.g., such as when the wash basket 120 is empty, the camera is clean, and the obtained images are clear), and these references images may be stored for future comparison with images obtained during appliance operation. Similarities and/or differences between the reference image and the obtained image may be used to extract useful information for improving appliance performance, e.g., by identifying one or more times when a lens cleaning procedure should be performed. Specifically, as shown in FIG. 7, the wash basket may include one or more reference marks (e.g., as identified generally by reference numeral 190) that are printed or otherwise formed at fixed locations within wash basket 120. By knowing the location, size, pattern, or other identifying features of these reference marks 190, controller may use these marks to facilitate determination of image quality.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet 50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that image processing and machine learning image recognition processes may be used together to facilitate improved image analysis, image quality detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

Step 230 may include comparing the image quality, e.g., as obtained at step 220, to a quality threshold. According to exemplary embodiments, the quality threshold may be set by a user, determined by manufacturer, or may be programmed or obtained by controller 166 in any other suitable manner, e.g., in order to ensure that appliance control algorithms are able to perform properly in response to imaging. If step 230 results in a determination that the image quality is greater than the quality threshold, method 200 may proceed to step 240 where appliance operation continues as normal, camera assembly 170 is used facilitate appliance performance, and the image obtained may be used in control algorithms for regulating the operation of washing machine appliance 100. It should be appreciated that the appliance may continue to obtain images periodically or upon the occurrence of certain events and these images may be periodically or intermittently checked for quality.

By contrast, if step 230 results in a determination that the image quality is below the quality threshold, method 200 may include operating the water dispenser to perform a lens cleaning operation. In this regard, for example, step 250 may include operating water dispenser 151 to provide a flow of water 157 over lens 182. This flow of water 157 may facilitate removal of soap bubbles, dirt, debris, or other contaminants affecting image quality from lens 182. For example, according to exemplary embodiments, the lens cleaning operation may include opening the water supply valve 158 to provide a flow of water 157 for a predetermined cleaning time. For example, the predetermined cleaning time may be between about 0.1 seconds and 10 minutes, between about 0.5 seconds and 5 minutes, or about 1 second. It should be appreciated that other cleaning times and operating sequences of water dispenser 151 are possible and within the scope of the present subject matter.

According to still other embodiments, step 250 may include dispensing detergent, wash additive, or some other cleaning solution to facilitate improved cleaning of lens 182. For example, detergent from a bulk dispense tank may be injected into the flow of water 157 passing over lens 182. In addition, the cleaning operation may includes adjusting the concentration of detergent, implementing pause times to permit the detergent to break down dirt or grime on lens 182, and may further include a final clean water rinse procedure to remove any remaining soils and detergent on the lens 182.

Method 200 may further include steps for ensuring that the image quality has reached the desired level after the lens cleaning process and/or providing a user notification if the cleaning process fails. For example, step 260 may include waiting a predetermined amount of time after the lens cleaning process has stopped, e.g., after the flow of water 157 ceases. For example, the predetermined amount of time may be the amount of time sufficient for flow of water 157 to drip off or partially dry from lens 182. For example, the predetermined amount of time may be between about 1 and 30 seconds, between about 3 and 10 seconds, or about 5 seconds. After this predetermined delay, step 270 may include obtaining a verification image using camera assembly 170. In this regard, after the lens cleaning process has been performed and the flow of water 157 has dripped or dried from lens 182, camera assembly 170 may obtain another image that is intended to verify that the lens 182 has been cleaned and that the images produced by camera assembly 170 are suitable for appliance operation. In order to determine the suitability, the verification image may be analyzed in the same manner as described above (e.g., at step 220). In this regard, the verification image may proceed to step 230 where the image quality of the verification image is compared to the quality threshold.

This process may continue until camera assembly 170 is producing images of sufficient quality to perform various methods as described herein related to the performance of washing machine appliance 100. However, in the event a lens cleaning process is not able to sufficiently clear dirt, debris, detergent, etc. from lens 182, method 200 may further include providing a user notification as to the soiled lens or otherwise providing the user with instructions to clean the lens of the camera assembly. According to exemplary embodiments, this user notification or instruction may be provided via a user interface panel, such as control panel 160. According to alternative embodiments, controller 166 may be in operative communication with a remote device (such as a mobile phone) via a communication network for providing the user notification or interaction.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that this method may be applied to the operation of any suitable laundry appliance, such as another washing machine appliance or a dryer appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
   a wash tub positioned within a cabinet;
   a wash basket rotatably mounted within the wash tub and defining a wash chamber configured for receiving a load of clothes;
   a water dispenser mounted within the cabinet for selectively providing a flow of water into the wash tub through a water outlet;
   a camera assembly mounted within the cabinet in view of the wash chamber, the camera assembly being positioned such that a lens of the camera assembly is positioned adjacent the water outlet; and
   a controller operably coupled to the camera assembly and the water dispenser, the controller being configured to:
   obtain one or more images of the wash chamber using the camera assembly;
   analyze the one or more images using an image processing algorithm or a machine learning image recognition process to determine an image quality;
   determine that the image quality has dropped below a quality threshold by comparing the image quality of the one or more images to the quality threshold, the quality threshold being predetermined and stored in the controller; and
   operate the water dispenser to perform a lens cleaning operation in response to determining that the image quality has dropped below the quality threshold.

2. The washing machine appliance of claim 1, wherein the image processing algorithm comprises using image differentiation or blur detection algorithms to compare the one or more images to a reference image.

3. The washing machine appliance of claim 1, wherein analyzing the machine learning image recognition process comprises at least one of a convolution neural network ("CNN"), a region-based convolution neural network ("R-CNN"), a deep belief network ("DBN"), or a deep neural network ("DNN") image recognition process.

4. The washing machine appliance of claim 1, wherein the wash basket comprises one or more reference marks, and wherein analyzing the one or more images comprises:
   identifying the image quality based at least in part on the one or more reference marks.

5. The washing machine appliance of claim 1, wherein operating the water dispenser to perform a lens cleaning operation comprises:
opening a water supply valve to provide the flow of water for a predetermined cleaning time.

6. The washing machine appliance of claim 5, wherein detergent is added to the flow of water during the predetermined cleaning time.

7. The washing machine appliance of claim 5, wherein the predetermined cleaning time is between about 0.1 second and 10 minutes.

8. The washing machine appliance of claim 1, wherein the controller is further configured to:
wait a predetermined amount of time after performing the lens cleaning operation;
obtain one or more verification images of the wash chamber using the camera assembly;
analyze the one or more verification images to determine the image quality; and
determine that the image quality exceeds the quality threshold.

9. The washing machine appliance of claim 1, wherein the washing machine appliance is a top load washing machine appliance, the water outlet is positioned above the wash tub proximate a rear of the wash tub, and a lens of the camera assembly is positioned below the water outlet and over the wash tub.

10. The washing machine appliance of claim 9, wherein the lens of the camera assembly protrudes out into the wash tub and toward an axis of rotation of the wash basket further than the water outlet.

11. The washing machine appliance of claim 1, wherein the washing machine appliance is a front load washing machine appliance, the water outlet is positioned above a door of the front load washing machine appliance, and the camera assembly is mounted to the door.

12. The washing machine appliance of claim 1, wherein the controller is further configured to:
provide a user with instructions to clean a lens of the camera assembly.

13. The washing machine appliance of claim 1, further comprising:
a tub light for illuminating the wash chamber, wherein the controller is further configured to turn on the tub light prior to obtaining the one or more images of the wash chamber.

14. A method of operating a washing machine appliance, the washing machine appliance comprising a wash basket rotatably mounted within a wash tub and defining a wash chamber configured for receiving a load of clothes, a water dispenser for selectively providing a flow of water into the wash tub through a water outlet, and a camera assembly mounted adjacent the water dispenser and in view of the wash chamber, the method comprising:
obtaining one or more images of the wash chamber using the camera assembly;
analyzing the one or more images using an image processing algorithm or a machine learning image recognition process to determine an image quality;
determining that the image quality has dropped below a quality threshold by comparing the image quality of the one or more images to the quality threshold, the quality threshold being predetermined and stored in the controller; and
operating the water dispenser to perform a lens cleaning operation in response to determining that the image quality has dropped below the quality threshold.

15. The method of claim 14, wherein the image processing algorithm comprises using image differentiation or blur detection algorithms to compare the one or more images to a reference image.

16. The method of claim 14, wherein analyzing the machine learning image recognition process comprises at least one of a convolution neural network ("CNN"), a region-based convolution neural network ("R-CNN"), a deep belief network ("DBN"), or a deep neural network ("DNN") image recognition process.

17. The method of claim 14, wherein operating the water dispenser to perform a lens cleaning operation comprises:
opening a water supply valve to provide the flow of water for a predetermined cleaning time.

18. The method of claim 14, further comprising:
waiting a predetermined amount of time after performing the lens cleaning operation;
obtaining one or more verification images of the wash chamber using the camera assembly;
analyzing the one or more verification images to determine the image quality; and
determining that the image quality exceeds the quality threshold.

* * * * *